United States Patent [19]

Saganovsky et al.

[11] Patent Number: 4,628,232

[45] Date of Patent: Dec. 9, 1986

[54] ANTI-PLUG REVERSING MODULE

[75] Inventors: Abraham Saganovsky, Brooklyn; William W. Chester, Bronx, both of N.Y.

[73] Assignee: KB Electronics Inc., Brooklyn, N.Y.

[21] Appl. No.: 737,698

[22] Filed: May 28, 1985

[51] Int. Cl.[4] .......................... H02P 1/22; H02P 3/10
[52] U.S. Cl. .................... 318/284; 318/261; 318/291; 318/293; 318/331
[58] Field of Search ............... 318/139, 255, 256, 258, 318/261, 264, 291, 293, 283, 284, 331

[56] References Cited

U.S. PATENT DOCUMENTS

| | | | |
|---|---|---|---|
| 3,551,774 | 12/1970 | Rusch | 318/139 X |
| 3,584,281 | 6/1971 | Reeves | 318/284 X |
| 3,748,557 | 7/1973 | Mittelstaedt | 318/256 |
| 3,967,175 | 6/1976 | Turley | 318/261 X |
| 4,384,240 | 5/1983 | Sloan | 318/139 X |
| 4,514,665 | 4/1985 | Melocik et al. | 318/139 |
| 4,518,902 | 5/1985 | Melocik et al. | 318/139 X |

FOREIGN PATENT DOCUMENTS 1456588  11/1976  United Kingdom ............... 318/258

Primary Examiner—William M. Shoop, Jr.
Assistant Examiner—Bentsu Ro
Attorney, Agent, or Firm—Lieberman, Rudolph & Nowak

[57] ABSTRACT

An anti-plug reversing circuit for use with a variable speed D.C. motor which provides safe and fast motor reversing with dynamic braking. The circuit, by sensing counter-EMF, prevents the premature application of a voltage of opposite (reversing) polarity until the motor armature has come to a full stop. The circuit advantageously utilizes a three-wire control input, is low cost, easily manufactured and applicable for use with low cost D.C. motors.

6 Claims, 2 Drawing Figures

4,628,232

ANTI-PLUG REVERSING MODULE

FIELD OF THE INVENTION

This invention relates to D.C. motor controls and more particularly to an Anti-plug Reversing Module (APRM) which, when used with a variable speed D.C. motor speed control, provides safe and fast reversing of a PM or Shunt Wound Motor, while also providing dynamic braking.

BACKGROUND OF THE INVENTION

Motor speed controls for D.C. motors have been long used in a variety of applications. Such speed controls, while providing the ability to vary the motor speed, are generally designed to operate a D.C. motor unidirectionally. Indeed, if reversing is attempted with a standard speed control by instantly applying a voltage to the motor of the opposite polarity, arcing and eventual destruction of motor and controller will result due to the counter-EMF generated by the operating motor.

Circuits designed to permit reversing of a D.C. motor without causing damage are known in the prior art. Such circuits generally operate a set of relay contacts to apply a reversing voltage to the motor and to prevent damage, mechanical interlocks or electrical sensing circuits are used to inhibit application of the reversing voltage until the motor has come to a complete stop and/or the counter-EMF has decreased to essentially zero. However, although such circuits are known they are generally complicated and expensive and thus find few applications for small size D.C. motors.

It is, therefore, an object of the instant invention to provide a circuit capable of reversing a D.C. motor, which circuit is relatively inexpensive, easy to manufacture and highly reliable.

It is a further and general object of the instant invention to provide an anti-plug reversing circuit that is relatively simple and uncomplicated, yet capable of wide use with low cost D.C. motors.

SUMMARY OF THE INVENTION

In accordance with the invention, a circuit is provided for safely reversing the direction of rotation of a D.C. motor by reversing the direction of current flow through the motor armature.

It is a feature of the invention that a three wire, three position switch, controls the direction of motor rotation, the switch having a forward position, a reverse position and a braking position.

It is another feature of the invention that the circuit, in response to said switch being moved from said forward to said reverse position and from said reverse to said forward position, removes motor driving voltage and senses motor counter-EMF to determine when said motor has essentially ceased rotation.

It is a still further feature of the invention that the circuit, in response to a cessation of motor rotation when said switch is moved from said forward position to said reverse position and from said reverse position to said forward position, operates a motor relay to reverse the direction of current flow through the motor armature.

It is another feature of the invention that the motor is dynamically braked via a braking resistor when said switch is moved to the brake position.

It is a still further feature of the invention that if the braking resistor opens for any reason, the sensing portion of the inventive circuit remains operative.

BRIEF DESCRIPTION OF THE DRAWINGS

The above objects and features of the invention will be more fully appreciated from the following detailed description when taken in conjunction with the accompanying drawings in which.

DETAILED DESCRIPTION

Figure 1:
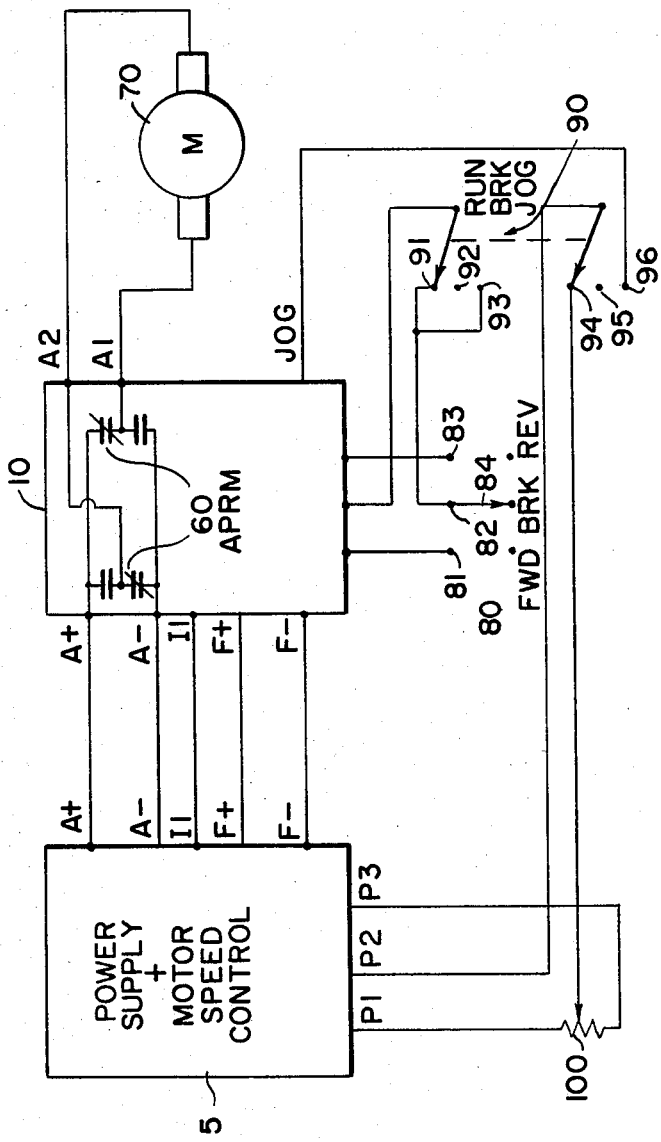
FIG. 1 is a block diagram showing the manner in which the instant invention is connected to a D.C. motor.

Referring to FIG. 1, there is shown one suggested configuration for use of the Anti-Plug Reversing Module (APRM) 10 of the instant invention. Power supply and motor speed control circuit 5 provides motor driving voltage A+, A− to the APRM and to D.C. motor 70 via the contacts of motor direction relay 60, which in this embodiment is included within the APRM. The counter-EMF of motor 70 is applied to the APRM at terminals A1, A2. Also included is an inhibit control terminal I1, which, upon application of the proper control signal to the motor speed control by the APRM circuit, causes the motor speed control to electronically extinguish its output motor voltage A+, A−. Terminals F+, F− carry the logic power supply voltages to the ARPM internal circuitry.

The direction of motor rotation is controlled by the contacts of motor relay 60 and control switch 80. Switch 80 is shown in FIG. 1 as being in the brake (BRK) position, which results in the motor being stopped with dynamic braking as will be explained below. Moving contact 84 to establish a connection between terminals 81 and 82, places switch 80 in the forward (FWD) position, applying power to the motor through the normally closed contact of relay 60 to allow the motor to operate in the forward direction. Moving contact 84 to establish a connection between terminals 83 and 82 places switch 80 in the reverse (REV) position. This action (in a manner to be described below) closes the normally open contacts of relay 60 and opens the normally closed contacts, thereby reversing the direction of current flow through the armature of motor 70, and accordingly reversing the direction of motor rotation.

Switch 90, shown in FIG. 1, is operative to place the motor 70 in a JOG mode as will be described below. Switch 90 is a DP DT switch (ON-OFF-momentarily ON) and is only necessary for the operation of the inventive circuit when a JOG function is required. While in the RUN position switch 90 has no effect on the operation of the APRM. Potentiometer 100 is the main speed control for motor speed circuit 5. As the function of this component is well known in this technical area, further description will not be provided.

Figure 2:
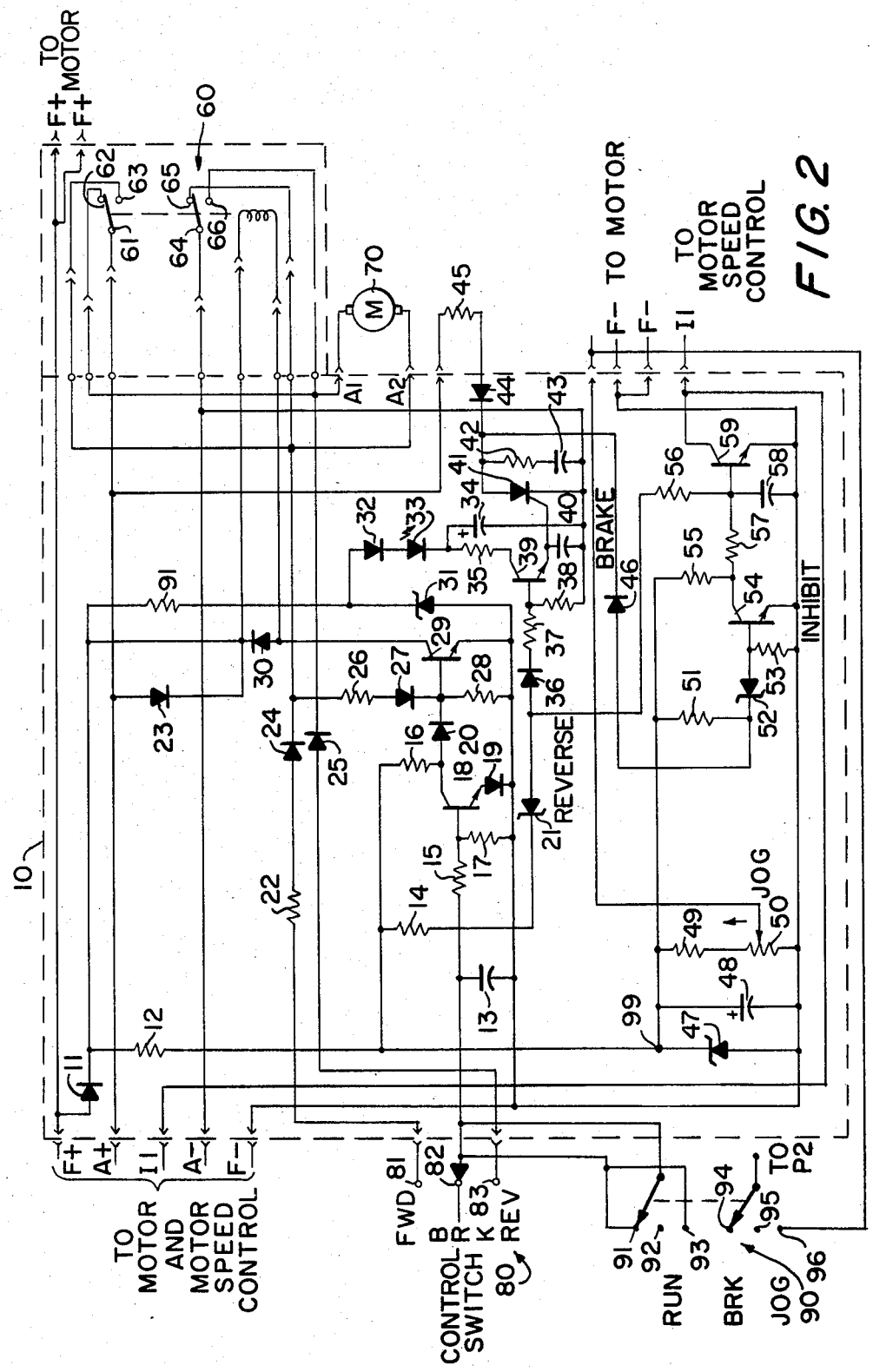
FIG. 2 illustrates a detailed schematic diagram of the circuit of the instant invention.

Referring now to FIG. 2, there is shown a detailed illustration of APRM 10. More particularly, power is applied to the APRM at terminals A+ and A−, with power being extended from the APRM to the motor schematically illustrated at 70. Terminals A1 and A2 extend to the motor 70, as illustrated in FIG. 1, and return the counter-EMF, or armature voltage to the APRM for use in a manner to be described below. Terminal I1 is the inhibit function described above, which permits the APRM, upon generation of an appropriate control signal, to cause the associated motor speed control to extinguish electronically the voltage applied to the motor. Motor control is accomplished with control switch 80, which permits an operator to cause the motor to run in a forward direction, in a reverse direction, or to accomplish dynamic braking of the motor. The legends "Reverse", "Brake", "Inhibit" and "Jog" shown in FIG. 2, generally identify the portions of the circuit performing these functions. Switch 90 controls the JOG function as will be described below.

Power for the logic circuitry is applied to the APRM circuit at terminal F+, through diode 11, (used to isolate F+ voltage supply) resistor 12, zener diode 47 and from there to terminal F=. Zener diode 47 is a 22 volt zener, such that 22 volts are present at connection point 99. The A− terminal is connected to the F− terminal through internal impedance in the associated motor speed control circuit 5. For purposes of this description, both the A− and F− terminals will be considered to be circuit ground.

Assume now that control switch 80 is set to operate the motor in the forward direction. This position of control switch 80 connects terminal 82 to terminal 81, resulting in the presence of approximately 3.5 volts at terminal 82. Terminal 82 is connected to the APRM 10 through switch 90 when Switch 90 is in either the RUN or JOG position. The power supply circuit path is from terminal F+ through diode 11, resistor 12, resistor 14, through terminals 81 and 82 and from there through resistor 22, diode 24 contacts 64 and 65 of relay 60 and from there to the A− terminal. The voltage drop across resistor 22 is responsible for the 3.5 volts present at terminal 82.

Application of approximately 3.5 volts at terminal 82 turns transistor 18 ON, which turns relay driving transistor 29 OFF. With transistor 29 OFF, relay 60 is deenergized with the contacts assuming the positions shown in FIG. 2. Diode 20 is a protection diode for transistor 29, while resistors 15 and 17 and diode 19 provide biasing for transistor 18. Diodes 20 and 27 form an OR gate to drive transistor 29 either from resistor 16 (REV to RUN) or from resistor 26 and diode 27 (REV to FWD switching period). The 3.5 volts at terminal 82 is not sufficient to break down zener diode 21, thus transistor 59 (Inhibit signal generation) and transistor 39 (Dynamic Braking) are both OFF. In this configuration the Inhibit Signal, which is generated by transistor 59, is not present and thus power continues to be applied from the motor control speed circuit. Also, SCR 41 is OFF in this configuration, such that there is no braking action which will be described below. Accordingly, with switch 80 in the forward position the motor accelerates and runs in the forward direction as long as terminal 82 is connected to terminal 81.

Considering now the operation of the APRM circuit in the reverse direction assume that control switch 80 is set to the REV position, with terminal 82 connected to terminal 83. In this position the voltage at terminal 82 is approximately 0.8 volts. The power supply current path in this configuration is from terminal F+ through diode 11, resistor 12, resistor 14, terminals 82 and 83, diode 25, the armature of motor 70 and from there through relay contacts 65 and 64 to the A− terminal. The presence of 0.8 volts at terminal 82 results in the following; transistor 18 is turned OFF (due to the additional bias provided by diode 19) and the 22 volts present at point 99 is applied to the base of transistor 29 through resistor 16 and diode 20. Transistor 29 is thereby turned ON energizing relay 60. Energizing relay 60 reverses the direction of current flow through the motor armature (as described above) and results in a new continuity path from the 22 volts present at point 99 to terminal F−. This path is through resistor 14, terminal 82, terminal 83, diode 25, contacts 66 and 64 of relay 60 and from there to the A− terminal. The 0.8 volts at terminal 82 is not sufficient to break down zener diode 21 so transistors 59 and 39 are OFF. The Inhibit control signal is not present at the associated motor speed control and SCR 41 is off, so that there is no braking action. Accordingly, the motor accelerates and runs in the reverse direction as long as terminal 82 is shorted to terminal 83.

What will now be described is the operation of the APRM when control switch 80 is set to the BRK position. In the BRK position, terminal 82 is in a neutral mode, connected to the APRM 10 circuit only through switch 90 (when switch 90 is in the RUN or JOG position). Consequently the 22 volts present at point 99 drops across resistor 14 resulting in approximately 12 volts at the junction of resistors 14 and 15 as well as at terminal 82. This results in turning transistor 18 ON, dropping the voltage at its collector to approximately 0.5 volts, which in turn causes transistor 29 to be in the OFF state. Relay 60 is deenergized so the relay contacts are in the position shown in FIG. 2. The 12 volts present at terminal 82 causes zener 21 to break down into conduction turning transistors 59 and 39 ON simultaneously. Voltage is applied to the base of transistor 39 via diode 36 and resistor 37, while the voltage is applied to the base of transistor 59 via resistor 56. At this point the collector-to-emitter voltage of transistor 59 is approximately 0.05 volts which serves as an Inhibit command to the associated speed control circuit. appearing at inhibit control terminal I1 of APRM 10. This Inhibit command signal causes shutdown of the motor supply voltage by the associated motor speed control circuit resulting in the voltage at terminal A+ going to zero. Turning transistor 39 ON provides a triggering signal for SCR 41 and also permits LED 33 to go ON as an indication of the BRK mode. Capacitor 34 stores energy to guarantee that SCR 41 is turned ON. Diode 32 allows capacitor 34 to charge up to 22 volts by blocking any discharge path for this capacitor. When SCR 41 is ON, braking resistor 45 is placed in parallel with the motor armature. The energy stored in the rotating motor is then dissipated in braking resistor 45 causing a dynamic braking action which brings the motor to a fast stop. There would, of course, be no braking action if the motor were not running prior to being placed in the BRK mode. Diode 32 provides protection from reserve voltage for transistor 39 and LED 33 if the braking resistor opens during motor operation. Zener diode 31 provides 22 volts for transistor 39, while resistor 35 determines the duration of the SCR firing pulse which is the discharge time of capacitor 34 when transistor 37 goes ON.

What has been described is the three basic functions of the APRM circuit, (BRK, FRD and REV). What will now be described is the operation of the APRM circuit when control switch 80 is moved from the Forward to the Brake position with the motor running. As described above, when switch 80 is set to the brake position, terminal 82 is connected to the 22 volts present at point 99. This results in 12 volts being present at terminal 82 keeping transistor 18 ON and transistor 29 OFF, thereby keeping relay 60 deenergized. Transistors 59 and 39 go ON simultaneously with the operation of transistor 59 generating the Inhibit signal, which when applied to the associated motor speed control circuit eliminates the motor supply voltage. The operation of transistor 39 turns SCR 41 and LED 33 ON, placing braking resistor 45 in parallel with the motor armature. The energy of the rotating rotor is thus dissipated in resistor 45 bringing the motor to a fast stop. At the time the motor comes to a stop, SCR 41 turns OFF. LED 33 is also turned OFF and with the Inhibit signal being generated by transistor 59 the circuit remains in the Brake mode and the motor is prevented from further operation.

Similarly, when control switch 80 is moved from the Reverse position to the Brake position with the motor running, terminal 82 is connected to the 22 volt supply of zener 47 as described above. The voltage at terminal 82 changes to approximately 12 volts which turns transistors 18, 59 and 39 ON. This applies the Inhibit signal to the associated motor speed control circuit and the operation of SCR 41 begins dynamic braking bringing the motor to a fast stop. Transistor 29 is held in the ON state by the counter-EMF of the motor armature as long as the motor is still rotating. The circuit path for this function is through resistor 26 and diode 27. Resistor 28 is a biasing resistor. The voltage at the collector of transistor 18 is low, approximately 0.5 volts, but this does not turn transistor 29 OFF due to the reverse bias on diode 20. Only when the counter EMF drops to approximately 0.8 volts will transistor 29 go OFF, thereby deenergizing relay 60.

The primary function of the APRM circuit is to prevent circuit damage when a reversing voltage is applied during motor operation. This operation is described below. Assume control switch 80 is moved from the Forward position to the Reverse position, while the motor is running. With this change in control switch position, the voltage at terminal 82 changes from approximately 3.5 volts to 12 volts. Diode 25 is, at this time, reverse biased by the counter-EMF of the running motor and the 22 volts present at point 99 determines the potential at terminal 82. This potential allow transistor 18 to remain ON while transistors 59 and 39 go ON. This, as described above, applies the Inhibit control signal to the associated motor speed control circuit, thereby removing motor voltage. SCR 41 also goes ON to begin dynamic braking and the LED 33 is turned ON to indicate the braking action. At this time transistor 29 is OFF such that relay 60 remains deenergized. When the counter-EMF of the motor drops to approximately 11.4 volts diode 25 is no longer reverse biased and terminal 82 follows the voltage across the motor armature as it drops to zero potential. When the potential at terminal 82 reaches less than 5.6 volts zener diode 21 ceases to conduct thereby turning transistor 39 OFF. SCR 41 stays latched ON until the current in the armature drops below the SCR holding current of approximately 35 milliamps. All the time SCR 41 is ON, clamping diode 46 remains ON keeping zener diode 52 nonconducting. Accordingly, transistor 54 is OFF and its collector voltage is high. This holds transistor 59 ON, via resistor 57, which retains the application of the Inhibit control signal to the associated motor control circuit as described above. When the potential at terminal 82 reaches approximately 0.8 volts, transistor 18 goes OFF and transistor 29 turns ON, energizing relay 60 and reversing the direction of current flow to the motor. After SCR 41 is turned OFF, diode 46 no longer clamps the cathode potential of zener 52. Accordingly, zener 52 breaks down via resistor 51, turning transistor 54 ON bringing the base potential of transistor 29 to near its emitter level. At this time transistor 59 goes off removing the Inhibit control signal from the associated motor speed control circuit. The motor will now accelerate and run in the reverse direction as long as terminal 82 is shorted to terminal 83. It is important to note that the switching of relay 60 and the attendent application of the reversing voltage took place at the 0.8 volt level of the counter-EMF which is a safe level for the relay contacts. Also, no high reverse voltage was applied to the motor armature and thus plug reversing is not possible.

Resistor 55 serves two functions. When transistor 54 is OFF (BRK mode) 22 volts is applied to the collector of transistor 54 via resistor 55 and turns transistor 59 ON via resistor 57. When transistor 54 is ON resistor 55 allows the collector to go to circuit common (F−), thereby allowing transistor 59 to go OFF. However, if switch 80 is still in the Brake position, transistor 59 must remain on via resistor 56.

The primary purpose for resistor 57 is applicable when switch 80 is in the Brake position, SCR 41 is non-conducting, zener diode 52 is ON and transistor 54 is ON. Resistor 57 prevents transistor 59 from turning OFF, thus keeping the Inhibit ON as long as switch 80 is in the Brake position.

What will now be described is the operation of the APRM when control switch 80 is moved from the Reverse position to the Forward position while the motor is running. When control switch 80 is suddenly set to the Forward position while the motor is running in reverse, the voltage of terminal 82 changes from 0.8 volts to approximately 12 volts. Diode 24 is reverse biased by the counter-EMF of the running motor and the 22 volts at point 99 determines the potential at terminal 82. This turns transistor 18 ON, but transistor 29 also remains ON due to the voltage supplied by the counter-EMF through resistor 26 and diode 27. Accordingly relay 60 remains energized. Zener diode 21 breaks down and transistors 59 and 39 go ON simultaneously. This results in applying the Inhibit control signal to the associated motor speed control as described above. SCR 41 is also turned ON and dynamic braking begins with the braking indication being provided by LED 33 being turned ON as described above. When the counter-EMF drops to approximately 11.4 volts, diode 24 is no longer reverse biased and the potential at terminal 82 follows the voltage across the motor armature as it decreases toward zero. When the potential at terminal 82 reaches less than 5.6 volts, zener 21 ceases to conduct. At this point transistor 39 goes OFF, LED 33 goes OFF and SCR 41 stays latched ON until the current in the armature drops below its holding current of approximately 35 milliamps. During the interval when SCR 41 is ON clamping diode 46 keeps zener 52 nonconducting. Accordingly, transistor 54 is OFF retaining transistor 59 in an ON condition which continues to apply the Inhibit control signal to the motor speed control circuit. At this point, transistor 29 remains ON and relay 60 remains energized. When the motor comes to almost a full stop the voltage at terminal 82 becomes approximately 0.8 volts. However, this potential isn't sufficient to break down zener 21.

Therefore, transistor 39 goes OFF, LED 33 goes OFF and SCR 41 ceases to conduct. At this point, transistor 29 goes OFF, deenergizing relay 60, (applying reversing voltage) transistor 54 goes ON and transistor 59 is turned OFF, removing the Inhibit control signal from the motor speed control circuit. Accordingly, at this time the motor accelerates and runs in the forward direction as long as terminal 82 is shorted terminal 81. Again nonplug switching is accomplished without damage to controller or relay contacts.

The instant invention also provides for AC line failure protection. Line failure while the motor is running in the reverse direction may cause the following. Relay 60 becomes deenergized because F+ voltage is no longer present. This would deenergize relay 60 and applies full reverse armature potential to the associated motor speed control circuit and may cause failure of the motor speed control circuit or may weld the contacts of relay 60. To prevent this failure, a secondary power supply is provided both to the APRM logic and relay 60 from the counter-EMF through diode 23. This voltage keeps relay 60 energized until the motor has coasted to a near stop. This same operation also results if braking resistor 45 fails. The motor will again coast to a stop, but without the advantage of dynamic braking. However, the motor will stop before relay 60 changes state. Diode 23 also functions to isolate armature current to F+ through diode 11.

As described above, switch 90 functions to place the motor in the JOG mode. Switch 90 is a DPDT switch with an ON-OFF and Momentarily ON function. During normal operation, switch 90 is placed in the RUN position as shown in FIGS. 1 and 2. When entering the JOG mode, switch 90 is first placed in the BRK position to insure motor stop in the manner described above. The switch is then momentarily placed (switch 90 is spring loaded) in the JOG mode which applies a reduced voltage to the main speed control potentiometer 100 via terminal 96. The reduced voltage is derived from potentiometer 50, which may be preset during assembly. The JOG mode can be utilized in both the Forward and Reverse directions by operation of switch 80.

When the motor is running in either the FWD or REV direction and the brake SCR 41 is accidentally fired, or becomes defective in a shorted condition, the "brake protect circuit" comes into effect. Because SCR 41 has a low voltage drop across its anode to cathode (approx. 1.1 V), it clamps the cathode of zener 52 to A-via diode 46. This causes transistor 54 to turn OFF. Its collector voltage is now 22 V (reference point 99 through resistor (55)) which turns on transistor 59 through resistor 57 which, in turn, activates the Inhibit Circuit. Thus, the associated power supply shuts down the armature voltage applied to the motor. This "inhibit" condition remains on until the armature current through brake resistor 45 drops to a value of 35 milliamps. SCR 41 turns OFF. This releases the clamp to zener 52 which turns transistor 54 ON, turning transistor 59 OFF. Inhibit is then no longer applied to the power supply module which allows the armature supply to go on at a controlled acceleration rate.

What has been shown and described is an anti-plug reversing module which permits the safe and quick reversal of a D.C. motor while also providing dynamic braking. The instant invention is low cost, easy to manufacture and finds wide application, especially with small size D.C. motors.

The foregoing disclosure and description of the invention is illustrated and explanatory thereof and various changes may be made in the illustrated embodiments within the scope of the appended claims and without departing from the spirit of the invention.

I claim:

1. A circuit for reversing the direction of rotation of a D.C. motor comprising;

relay means, having a deenergized state and an energized state, for reversing the direction of current flow through the D.C. motor armature, a three position, three wire, switch having a forward position, a reverse position and a motor braking position, each switch position corresponding to a motor operation, means responsive to said switch being moved from said forward position to said reverse position while said D.C. motor is rotating in a forward direction, for removing motor driving voltage from said D.C. motor and for sensing motor counter-EMF to determine when said D.C. motor has essentially ceased rotation, and means responsive to said means for sensing motor counter-EMF for operating said relay means to reverse the direction of current flow through the D.C. motor armature at a point at which motor rotation has essentially ceased.

2. A circuit in accordance with claim 2, wherein said removing and sensing means is also responsive to said switch when said switch means is moved from said reverse direction to said forward direction.

3. A circuit in accordance with claim 2, wherein said removing and sensing means further includes means for dynamically braking said motor rotation when said motor voltage is removed from said D.C. motor.

4. A circuit in accordance with claim 3, wherein said dynamic braking means is operative when said switch is moved from said forward position to said braking position and from said reverse position to said braking position to rapidly terminate said motor rotation.

5. A circuit in accordance with claim 4, wherein said dynamic braking means is further operative upon loss of supply voltage to said D.C. motor.

6. A circuit in accordance with claim 5, wherein said supply voltage to said D.C. motor is removed upon failure of dynamic braking means.

* * * * *